United States Patent [19]

Bjarklev et al.

[11] Patent Number: 5,469,292
[45] Date of Patent: Nov. 21, 1995

[54] METHOD OF AMPLIFYING AN OPTICAL SIGNAL, AN OPTICAL AMPLIFIER FOR PERFORMING THE METHOD, AND USE OF SUCH AN OPTICAL AMPLIFIER AS A SOURCE OF LIGHT

[75] Inventors: Anders O. Bjarklev, Roskilde; Thomas P. Rasmussen, Frederiksberg, both of Denmark

[73] Assignee: Lycom A/S, Brondby, Denmark

[21] Appl. No.: 182,078

[22] PCT Filed: Jul. 17, 1992

[86] PCT No.: PCT/DK92/00228

§ 371 Date: Jan. 12, 1994

§ 102(e) Date: Jan. 12, 1994

[87] PCT Pub. No.: WO93/02492

PCT Pub. Date: Feb. 4, 1993

[30] Foreign Application Priority Data

Jul. 19, 1991 [DK] Denmark .................. 1376/91

[51] Int. Cl.$^6$ ................ H01S 3/07; G02B 6/22
[52] U.S. Cl. ............ 359/341; 359/337; 385/126; 385/131; 372/6
[58] Field of Search .................. 359/337, 341; 385/124, 126, 127, 131; 372/6

[56] References Cited

U.S. PATENT DOCUMENTS

| | | | |
|---|---|---|---|
| 3,599,106 | 8/1971 | Surtzer | 359/341 |
| 3,626,312 | 12/1971 | Surtzer | 359/341 |
| 3,950,707 | 4/1976 | Hill et al. | 359/341 |
| 4,910,737 | 3/1990 | Payne et al. | |
| 5,027,079 | 6/1991 | Desurvire et al. | 359/341 |
| 5,291,501 | 3/1994 | Hanna | 372/6 |

FOREIGN PATENT DOCUMENTS

| | | |
|---|---|---|
| 2143561 | 6/1985 | European Pat. Off. |
| 2368196 | 5/1990 | European Pat. Off. |
| 2404152 | 12/1990 | European Pat. Off. |

OTHER PUBLICATIONS

Obro et al, Elect. Lett. (UK), vol. 27, #5, pp. 470–472, Feb. 1991; abst. only forwarded herewith.
Brieriey, M., LEOS Ann. Mtg. 1989, paper ELT 2.1, pp. 89 and 226–229. Kimura et al, Appl. Phys. Lett., vol. 53, #14, Oct. 3, 1988 (best copy now available–sections deforced).

*Primary Examiner*—Nelson Moskowitz
*Attorney, Agent, or Firm*—Ladas & Parry

[57] ABSTRACT

An optical amplifier for signal light. The amplifier amplifies signals at a certain signal wavelength and consists of an active optical waveguide (4) of simple wave type geometry at the signal wavelength, a pump laser (2) for obtaining inverted population between the energy levels involved and coupling devices for coupling pump light and signal light in the active optical waveguide (4). The active optical waveguide is doped with ions of transition metals or metals from the groups of Lanthanides or Actinides. This doping is in a cylinder shell-shaped area (13) around the axis of symmetry of the waveguide (4) so that the reduction in the optical power originating from amplified spontaneous emission is greater than the reduction in the optical power originating from amplified signal light.

17 Claims, 5 Drawing Sheets

METHOD OF AMPLIFYING AN OPTICAL SIGNAL, AN OPTICAL AMPLIFIER FOR PERFORMING THE METHOD, AND USE OF SUCH AN OPTICAL AMPLIFIER AS A SOURCE OF LIGHT

BACKGROUND OF THE INVENTION

The invention relates to an optical amplifier which amplifies signals at a certain signal wavelength and consists of an active optical wave guide of simple mode geometry at the signal wavelength, and a light source, e.g. a pump laser for obtaining inverted population between the energy levels involved and coupling devices for coupling pump light and signal light in the active optical wave guide. The wave guide is doped with active ions which are substantially positioned in a cylindrical shell-shaped area around the axis of symmetry of the wave guide.

The use of optical amplifiers constitutes a technically interesting field, because optical power can be amplified with these directly in an optical fiber or wave guide without conversion of the optical energy to electric energy.

Such optical amplifiers are used or may possibly be used in fiber optical communications systems, for fiber lasers, for fiber optical sensor systems or the like. Also amplifiers manufactured in plane wave guide technology can be used within the above-mentioned fields.

Optical amplifiers and in particular fiber optical amplifiers operate by the process "stimulated emission", where a material can emit light with the same wave vector and phase as incoming light, it being energy-supplied (pumped) with light from a strong pump source, typically a laser having a lower wavelength than the signal. Amplification in a material capable of amplifying by stimulated emission depends on the dipole moment of the quantum transition considered, on the wavelength of the signal and on the size of the relative population of the two quantum states directly involved. Where the upper one of the two levels has a greater population than the lower one, so-called inverted population, it is possible to obtain amplification. This inverted population is generated via absorption of pump light.

The materials capable of forming the basis for stimulated emission can generally be divided into two groups: 3-level systems and 4-level systems.

The European patent application 368 196 discloses a fiber amplifier in which the active $Er^{3+}$ ions are distributed along the axis of symmetry of the fiber in a cylinder shell which is contained completely within the core region. The optical fiber amplifier is pumped with energy distributed on several transversal wave types, and the cylinder shell is therefore spaced from the axis of symmetry corresponding to the distance where the pump light has maximum intensity. This design is not optimal for amplification of light by means of 4-level systems with amplified spontaneous emission (ASE) at lower wavelengths than the signal.

The invention also concerns a method of amplifying an optical signal with an optical amplifier, which is stated in claim 1. Hereby it is possible e.g. to obtain discrimination between the formation of spontaneous photons at a shorter wavelength (e.g. 1050 nm) by formation of signal photons at signal wavelength (e.g. 1340 nm) by stimulated emission. Amplification of signal photons will be increased considerably hereby, because the pump light creating inverted population for the levels involved is utilized better for the 1300 nm transition than for the 1050 nm transition. The invention can e.g. be worked in connection with effective amplifiers based on $Nd^{3+}$ doped ZBLAN glasses, but can be utilized by any 4-level optical amplifier to which it applies that the signal wavelength is greater than the wavelength of the dominating amplified spontaneous emission.

One of the crucial problems of e.g. $Nd^{3+}$ doped fibres is thus that a large amount of ASE is formed at considerably lower wavelengths than the wavelength of the signal to be amplified. The invention reduces this problem by using a special design of the active fiber. When the fiber is manufactured such that doping is in a ring around the axis of symmetry, the formation of the ASE having a low wavelength will be reduced relatively more than the stimulated amplification of signal light, and amplification at the signal wavelength will therefore be increased considerably. Removal of the doping from the center of the core reduces the amplification of the light both at the short and at the long wavelength, but the decisive point is that amplification of the light having the short wavelength is reduced relatively more than the long-waved light.

Since the undesirable ASE has a considerably lower wavelength than the signal, the region occupied by this ASE in the fiber, e.g. described by the dot size $D_{ASE}$, will be considerably smaller than the dot size $d_S$ of the signal. Amplification of the short-waved ASE therefore diminishes more rapidly than the amplification of the signal if the doping of the active ions is moved away from the center of the wave guide and is positioned in a cylinder shell-shaped area concentric with the axis of symmetry of the wave guide. The invention utilizes this circumstance for suppressing the undesirable ASE to achieve greater amplification of the desired signal. Another object of the invention is to provide an optical amplifier having improved efficiency over the prior art.

This object is achieved by an optical amplifier having the features defined in the characterizing portion of claim 2. A considerably part of the pump energy is hereby absorbed in parts of the active optical wave Guide, where the proportion between formation of spontaneous emission at considerably shorter wavelengths than the signal wavelength and the formation of spontaneous emission around the signal wavelength is greatest. Thus, also the proportion between amplification of the spontaneous emission at considerably shorter wavelengths than the signal wavelength and amplification of the signal light is greatest.

The active optical wave guide is doped with ions of transition metals or metals from the groups of Lanthanides or Actinides.

Claim 3 defines the active optical amplifier having a wave guide which, according to the invention, is to be produced with the doping which does not coincide with the core, if the active ion is of the 4-level type. Improved amplification will be obtained by moving the doping away or partly away from the core. If the inner radius of the doping is called $a_1$ and the outer radius of the doping is called $a_2$, these diameters will be related to the core radius a in the following manner:

$$a < a_2 \quad a_1 < a_2.$$

Claim 4 defines an amplifier consisting of three main elements: the active wave guide, coupling devices for coupling pump light and signal light as well as one or more pump sources. In case of $Nd^{3+}$ doping the pump source is to have a wavelength around 0.795 µm, while other active ions demand other pump wavelengths. The pump wavelength will be smaller than the signal wavelength under normal conditions.

Claim 5 defines an amplifier having an active wave guide doped with two or more active ions having overlapping amplification regions. This may be an advantage when using ions which themselves cannot cover the entire interesting amplification region.

Claim 6 defines an amplifier having two amplification regions, e.g. coinciding with the most interesting transmission fields within fiber optical communication. Such an amplifier may be produced using two different active ions having different amplification regions, e.g. $Nd^{3+}$ for the 1300 nm region and $Er^{3+}$ for the 1550 nm region.

Claim 7 defines an embodiment of an amplifier for the situation where such a double ion doping is necessary to obtain amplification in two wavelength regions. Here doping is performed with a 4-level ion in a cylinder shell-shaped area and with a 3-level ion in the core area, which is done to obtain the greatest amplification.

Claim 8 defines preferred ion types, which have been found to be more effective than others. Ions operating according to 4-level systems are preferred, because active optical wave guides made with doping of 4-level ions do not exhibit ground state absorption. The ions $Nd^{3+}$ and $Pr^{3+}$ are of special interest for the region around 1300 nm, which have both exhibited good amplification properties in this region.

Claim 9 shows that the host glass for the production of the active wave guide is of importance for the amplification properties, because the host glass affects the energy of the quantum states of the active ions. The host glass thus influences absorption wavelengths and emission wavelengths. Host glass based on $SiO_2$ is of special importance, because ordinary transmission fibers for optical communication are made of this material.

Claim 10 describes host glasses made on the basis of metal fluoride glasses, e.g. ZBLAN, which have another influence on the absorption and emission of the active ions than $SiO_2$ based glasses. ZBLAN glasses are particularly interesting, because it has been found possible to make $Nd^{3+}$ doped fibres having considerable amplification around 1300 nm in this material.

Claim 11 defines a preferred embodiment of the active optical wave guide. One of the most interesting uses of optical amplifiers is in connection with fiber optical transmission systems. In this case it is extremely advantageous that the active wave guide is an optical fiber. Then the active ions will lie like a cylinder shell concentrically around the axis of symmetry of the fiber and along the fiber core. The active doping can either overlap the core or be positioned right out in the cladding of the fiber.

Claim 12 defines an amplifier having an active wave guide based on plane wave guide technology. For certain uses, and especially if a particularly inexpensive amplifier component is desired, it is advantageous to make the amplifier as an integrated optical component. Then the wave guides, and thereby also the active optical wave guide, will have to be made in plane wave guide technology with wave guides having a substantially rectangular cross-section. Examples of substrate materials for such integrated components are $Si/SiO_2$, $LiNbO_3$ and III-V semiconductor materials.

Claim 13 defines the wave type of the pump light. If the pump light passes through the active wave guide in the fundamental transversal wave type, advantages are obtained in particular for 3-level ions with active doping in the core, but also 4-level ions having cylinder-symmetrical doping can be excited. It is important in this case that the 4-level ions are doped in a cylinder shell for the greatest amplification to be achieved.

Claim 14 defines the use of pump light with several wave types. For 4-level ions even greater amplification can be obtained if the pump light passes the active wave guide in several transversal wave types. The reason is that the higher order wave types give rise to a greater intensity of pump light away from the axis of the wave guide and thus have better overlap with the cylinder shell-shaped doping.

Claim 15 describes a preferred structure of the active optical fiber. Calculations show that an $Nd^{3+}$ doped ZBLAN fiber can be optimized to being particularly amplifying if doping is arranged in a region defined by:

$a_1/a$ is in the range [0.6; 1.4]

$a_2/a$ is in the range [0.85; 4.0]

Claim 16 defines the use of the amplifier described in claims 2–15 as a light source. When reflection devices, such as mirrors, couplers, reflection screens, etc., are arranged at one or both ends of the active wave guide, part of the light emitted from the amplifier will be returned to the amplifier and amplified additionally. Using such a reflection device broad spectrum optical sources having a short coherence length can be produced. Using reflection devices at both ends of the active wave guide, a laser can be produced, the laser cavity being defined by these two reflection devices.

BRIEF DESCRIPTION OF THE FIGURES OF THE DRAWING

The invention will be explained more fully below in connection with working examples and with reference to the drawing, in which FIG. 1 schematically illustrates a configuration of an optical amplifier.

DETAILED DESCRIPTION

Figure 1:
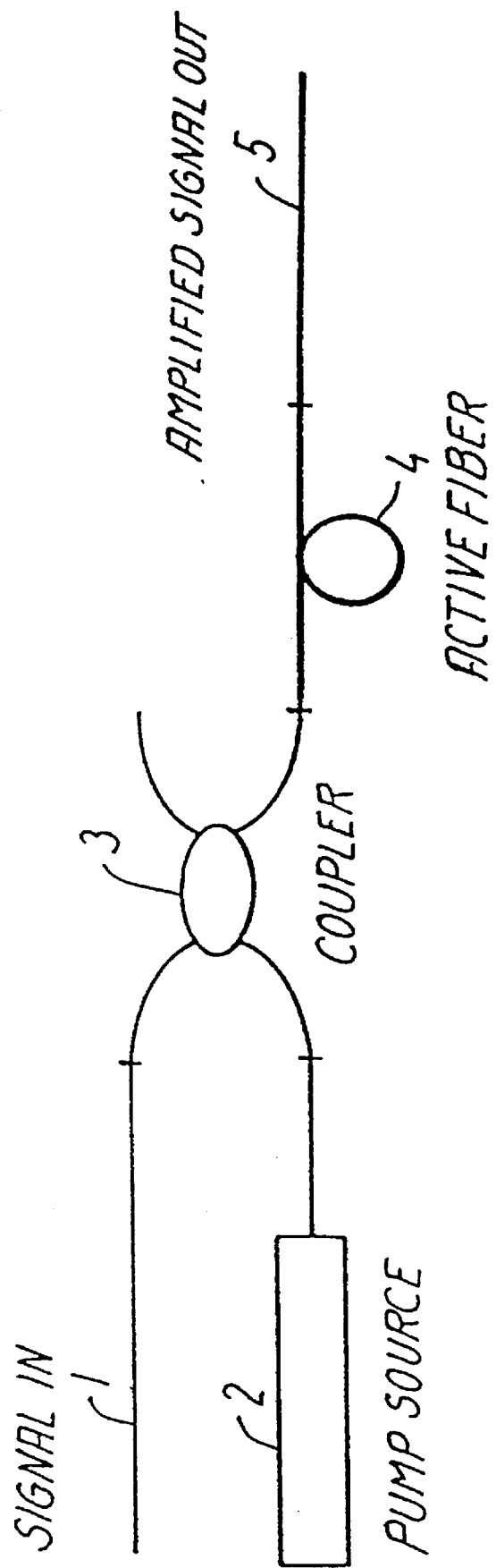

FIG. 1 illustrates a typical configuration of an optical amplifier. The weak signal to be amplified is passed to the amplifier via a wave guide 1. The amplifier is pumped by a pump source with wavelengths coinciding with one or more of the absorption transitions of the active wave guide. The pump light and the signal light are coupled into an active wave guide 4 by means of a coupling device 3. The amplified signal light is passed further on from the active wave guide to a wave guide 5. These are general principles of all optical amplifiers.

Figure 2:
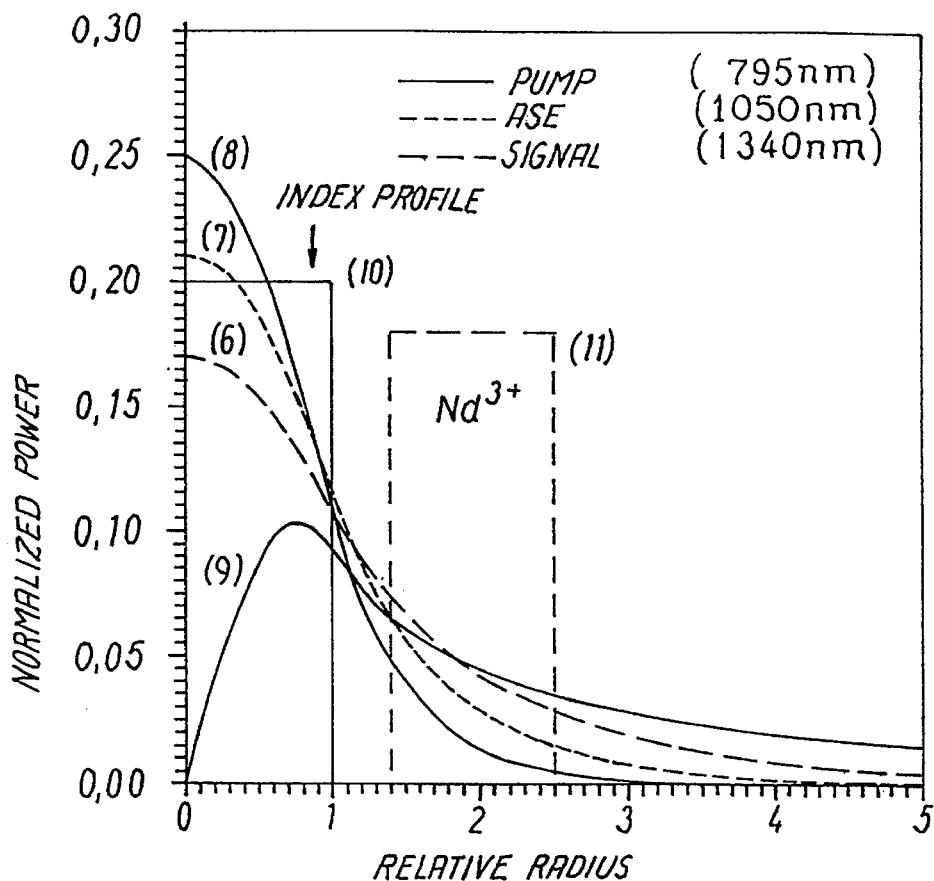
FIG. 2 shows the radial intensity distribution of the signal, the amplified spontaneous emission and the pump light together with the refractive index profile and the doping profile for an embodiment of an optical amplifier according to the invention.

FIG. 2 illustrates the invention with an example concerning an $Nd^{3+}$ doped ZBLAN fiber. The figure shows the radial intensity distribution of a wave guide signal at 1.34 µm in a dashed line 6, the amplified spontaneous emission at 1.05 µm in a broken line 7, and pump light at 0.795 µm as a solid line 8. These radial intensity distributions are shown as normalized power distributions. The figure moreover shows the refractive index profile 10, which is a step index profile in this example indicated by solid lines, and the doping profile 11, which is a cylindrical shell-shaped step index profile indicated by dashed lines.

Figure 3:
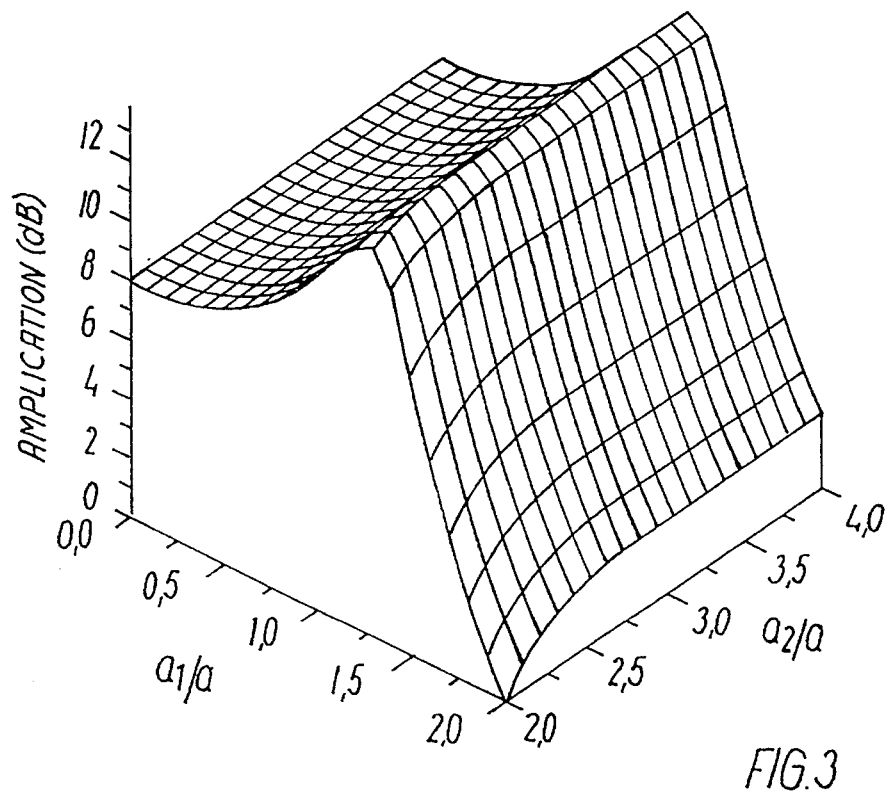
FIG. 3 shows an example of the relation between the amplification in the fiber and the inner and outer doping radius relatively to the core radius.

FIG. 3 shows an example of the result of a theoretical calculation of the amplification in a fiber corresponding to the one shown in FIG. 2. Amplification is indicated as a function of an inner relative doping radius $a_1/a$ and an outer relative doping radius $a_2/a$ for a pump power of 200 mW and a signal power of 0.1 µW, a numerical aperture of 0.3, a core radius of 1.02 µm and a fiber length of 5 m.

Figure 4:
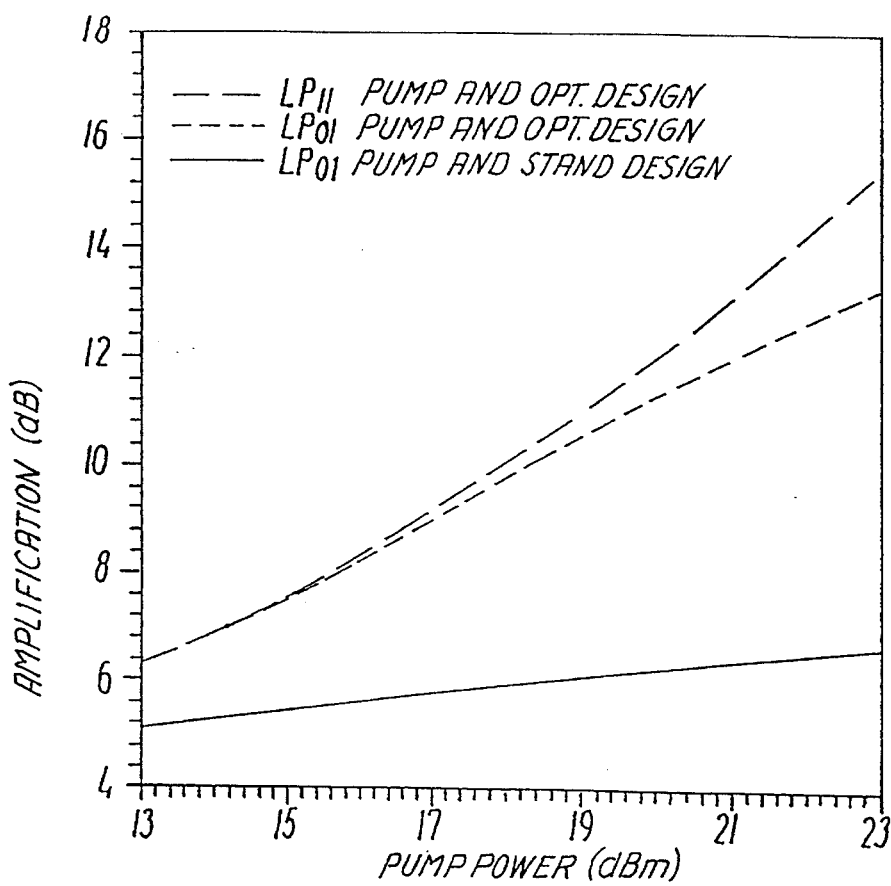
FIG. 4 shows the theoretically achievable amplification with doping in the core and with optimum positioning of the doping in a cylinder shell along the wave guide, respectively, using various wave types, FIG. 5, at the top, shows the optimum selection of inner and outer doping radius relatively to the core radius as a function of the numerical aperture of the fiber and three pump power levels, and the corresponding amplification is shown at the bottom, FIG. 6 schematically shows the position of the active ions in a preferred embodiment of the optical amplifier according to the invention.

FIG. 4 shows, for the same example of calculation, the achievable amplification respectively with doping in the core (solid line) and with optimum position of the doping according to the invention (dashed lines) as a function of the pump power. The signal power is 0.1 µW, the core radius 1.02 µm, the fiber length 5 m, and the numerical aperture is 0.3. The amplification for two different pump wave types is shown by long- and short-dashed curves, respectively.

Figure 5:
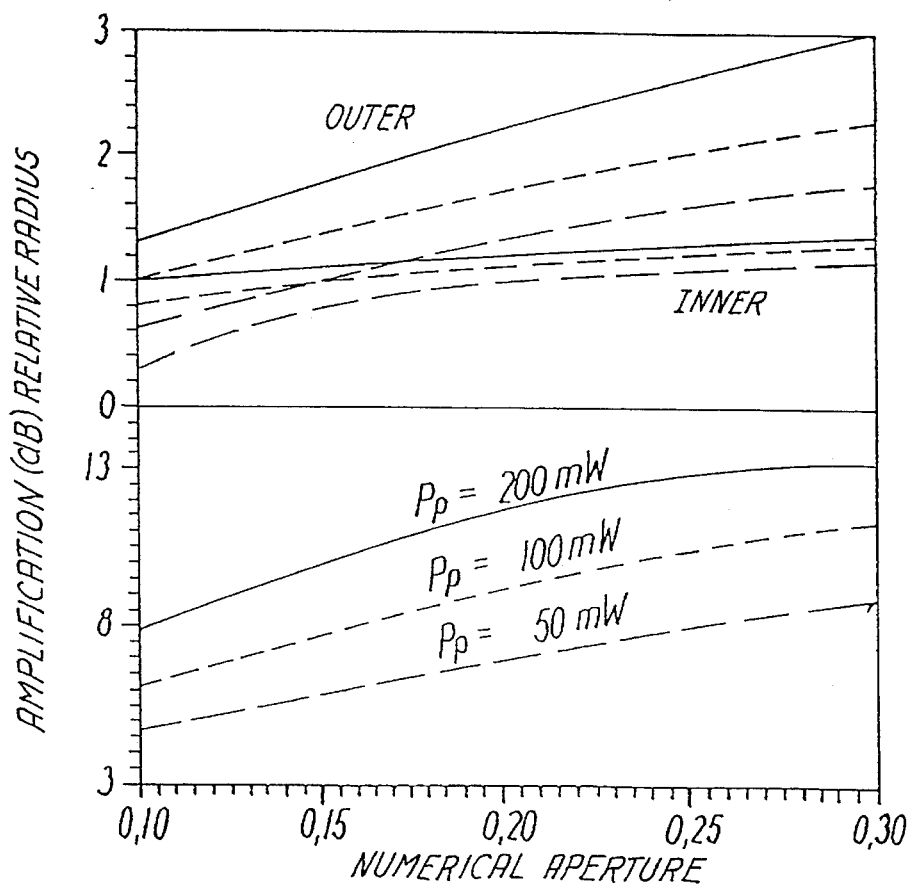

For the calculation example FIG. 5 at the top shows the optimum selection of inner and outer relative doping radii as a function of the numerical aperture for the fiber and three pump power levels indicated by a solid line (200 mW), short-dashed line (100 mW) and a long-dashed line (50 mW), respectively. The signal power is 0.1 µW, the fiber length is 5 m, and the cut-off wavelength for wave type $LP_{11}$ is 800 nm. The corresponding amplification is shown at the bottom. It will be seen in the shown example that the doping material is positioned within a cylinder shell whose inner radius $a_1$ corresponds to 1.4a, a being the radius of the fiber core. The outer radius $a_2$ will be about 2.5a. Preferably, $a_1/a$ and $a_2/a$ will be in the ranges [0.6; 1.4] and [0.85; 4.0].

Figure 6:
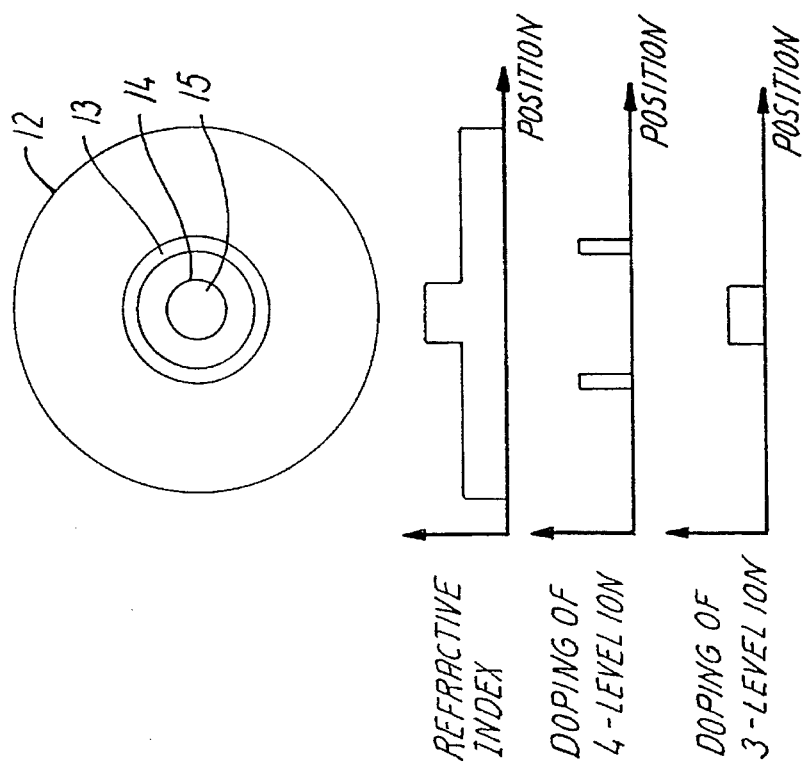

FIG. 6 shows the embodiment which is described in claim 6. The optical fiber 12 is seen in cross-section. The ring-shaped doping with 4-level ions is shown as 13, while the central doping with 3-level ions is shown as 15. In this case the core area 14 coincides with the doping of the 3-level ions. Graphical representations of the refractive index profile as well as the two active dopings transversely to the wave guide are shown at the bottom.

Figure 7:
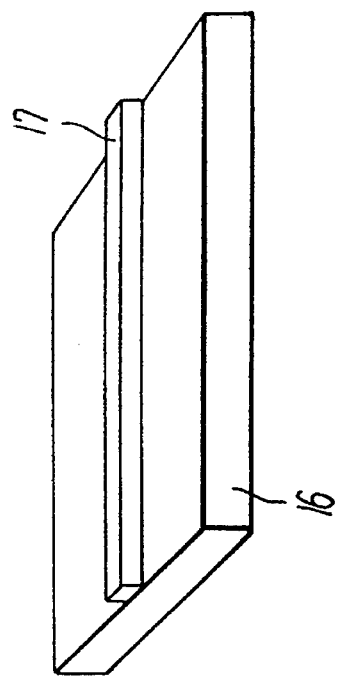
FIG. 7 shows an alternative embodiment of an optical amplifier according to the invention and realized in plane wave technology.

FIG. 7 shows the embodiment based on the use of plane wave technology. An active wave guide 17 is placed on a plane substrate 16 which may be either crystalline or amorphous. The wave guide is doped with active ions, so that it can be used in an optical amplifier according to the invention.

Figure 8:
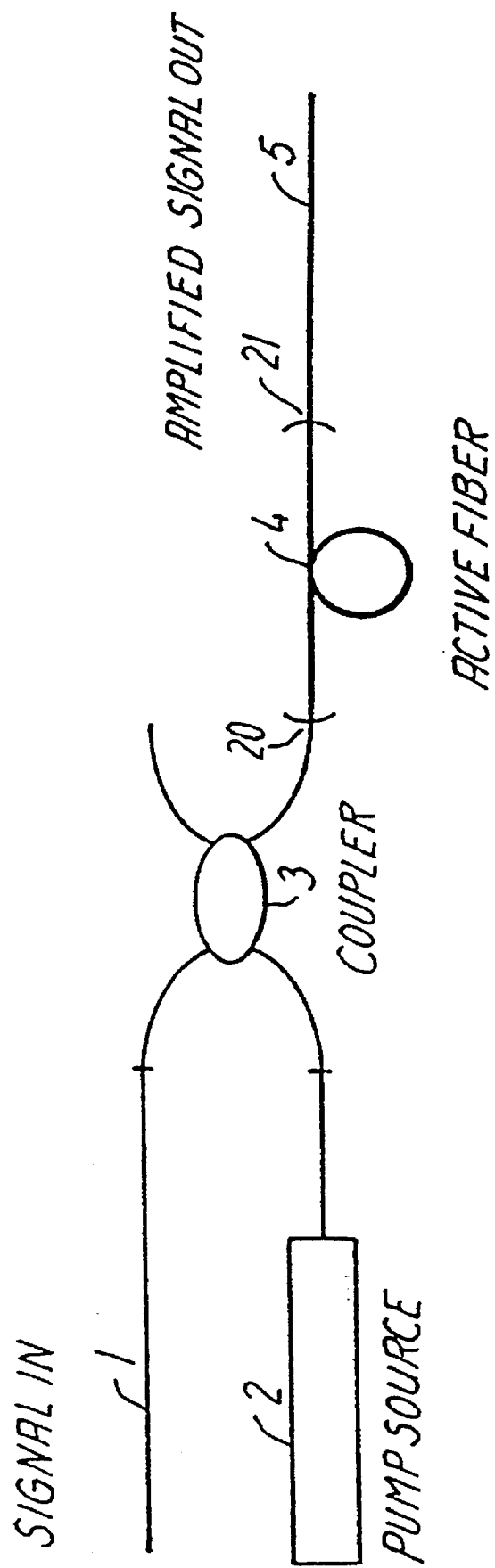
FIG. 8 shows a use according to the invention where the amplifier of the invention is used as a laser.

FIG. 8 shows a structure of an optical amplifier corresponding to the one shown in FIG. 1, but with partially transparent reflection devices 20, 21, such as mirrors, positioned at the ends of the active wave guide 4. A laser cavity will hereby be formed between the mirrors 20, 21.

Considerably more complicated configurations with several coupling devices, several pump sources, several active wave guides and other components, such as optical bandpass filters and optical isolators, may be used in special cases.

Generally, a 3-level system just involves three quantum states in the process because the ground state of the system operates as the lowest state for the amplifying quantum transition. These systems therefore have the less attractive property that they absorb signal light if they are not pumped. An example of a 3-level system is $Er^{3+}$ with emission around 1550 nm.

A 4-level system involves four or more quantum states in the amplificaton process, because the ground state is not the lowest state for the amplifying quantum transition. 4-level systems therefore do not exhibit signal absorption from the ground state. An example of a 4-level system is $Nd^{3+}$ with emission around 1340 nm.

Particularly optical communication in the wavelength regions around 1300 nm and 1550 nm is of interest. For uses around 1550 nm, $Er^{3+}$ doped fibres are employed for fiber based amplifiers, while amplifiers for 1300 nm have been long in coming. So far, the $Nd^{3+}$ doped fiber amplifier have been the most examined amplifier for the 1300 nm region. However, this amplifier has two serious problems. One is the excitation of ions from upper laser level to higher energy levels at absorption of signal light (excited state absorption), another is the generation of spontaneous photons around 1050 nm which are amplified vigorously through the fiber at the expense of the signal amplification around 1300 nm.

The problem of excited state absorption can be solved by using another host glass material than the commonly used $SiO_2$, e.g. ZBLAN.

With respect to the amplified spontaneous emission the only way of reducing this has so far been to use one or more filters positioned along the fiber.

An exact numerical model of a fiber amplifier has been used for evaluating various structures of the active optical wave guide. The result is that in a large number of cases the active doping should be completely outside the core of the fiber and should in certain cases be outside and within the core. In all the considered cases it was possible to obtain greater amplification using the cylinder shell-shaped doping according to the invention.

The invention and its results are exemplified by the following theoretical examinations: An $Nd^{3+}$ doped ZBLAN fiber is considered. It has an $ND^{3+}$ concentration of $9.5 \times 10^{24}$ $m^{-3}$ a numerical aperture of 0.3 a core radius of 1.02 µm, a length of 5 m and a step index profile. The signal wavelength is 1.34 µm, and the wavelength of the pump light is 0.795 µm. For a pump power of 200 mW coupled into the active fiber together with a signal power of 0.1 µW, amplification can be increased from 6.7 dB for doping in the core to 13.3 dB for doping positioned between an inner radius relatively to the core radius of 1.4 to an outer relative radius of 0.3.

What is claimed is:

1. A method of amplifying an optical signal with an optical amplifier having a 4-level lasing system, said optical signal having a wavelength-dependent field distribution transverse to an optical wave guide (4) doped with active, light-emittable ions positioned in a cylindrical shell (13) coaxially with the axis of symmetry of the wave guide (4), in which cylindrical shell (13) the active ions are excited for stimulated emission of optical energy at a first wavelength corresponding to the signal by pumping of optical energy at one or more other wavelengths, said method comprising providing the cylindrical shell (13) with active ions at such a distance from the axis of symmetry of the wave guide (4) that the active ions are excited for radiation of spontaneous emission in an area of the wave guide (4) where the reduction in the optical power originating from amplified spontaneous emission is grater than the reduction in the optical power originating from amplified signal light, the wavelength of the optical signal being greater than the wavelength at the dominating amplified spontaneous emission.

2. An optical amplifier for an optical signal having a field distribution depending on the structure of wave guides and the wavelength of the signal, comprising an active, optical wave guide (4) doped with active and light-emittable ions in a 4-level lasing system so that the optical signal with a first wavelength is amplified by passing the active, optical wave guide (4) when said wave guide is pumped with optical energy at one or more other wavelengths, said active ions being substantially positioned in a concentrical cylindrical shell (13) around an axis of symmetry of the wave guide (4), in which cylindrical shell (13) the optical pump energy excites the active ions for stimulated emission of optical energy at said first wavelength, said cylindrical shell (13) with active ions being positioned at such a distance from the axis of symmetry of the wave guide (4) that the reduction in the optical power originating from amplified spontaneous emission is greater than the reduction in the optical power originating from amplified signal light, the wavelength of the optical signal being greater than the wavelength of the dominating amplified spontaneous emission.

3. An optical amplifier according to claim 2, wherein the active wave guide is of the step index type with a core radius a, the active ions being present in said cylindrical shell (13) between an inner radius $a_1$ and an outer radius $a_2$, the radii a, $a_1$ and $a_2$ having the relationship, $a_1 < a_2$ and $a < a_2$.

4. An optical amplifier according to claim 2, including a coupling device (3) for coupling pump light and signal light, as well as one or more pump sources (2) emitting light at wavelengths different from the first wavelength of the signal light.

5. An optical amplifier according to claim 2, wherein the active optical wave guide (4) is doped with two or more active ions with overlapping amplification wavelength regions.

6. An optical amplifier according to claim 2, wherein the active optical wave guide (4) is doped with two or more active ions with different amplification wavelength regions.

7. An optical amplifier according to claim 2, wherein a first active 4-level ion is doped in said cylindrical shell (13), while a second active 3-level ion is doped in the core area (15).

8. An optical amplifier according to claim 2, wherein said active optical wave guide (4) is doped with $Nd^{3+}$ and $Pr^{3+}$ ions.

9. An optical amplifier according to claim 2, characterized in that the active optical wave guide (4) is made of a host glass, mainly consisting of $SiO_2$.

10. An optical amplifier according to claim 2, wherein the active optical wave guide (4) of the amplifier is made of a fluoride host glass, preferably of the type ZBLAN.

11. An optical amplifier according to claim 2, wherein the active optical wave guide (4) is an optical fiber with a circular cross-section and a core area (14) which is positioned coaxially with the longitudinal axis of the wave guide (4).

12. An optical amplifier according to claim 2, wherein the active optical wave guide (17) is made on a plane substrate (16) with a substantially rectangular cross-section.

13. An optical amplifier according to claim 2, wherein the amplifier is pumped with pump light which is transmitted in the active optical wave guide (4) with a wave length of the lowest order.

14. An optical amplifier according to claim 2, wherein the amplifier is pumped with pump light which is transmitted in the active optical wave guide (4) at several wavelengths.

15. Use of an optical amplifier according to claim 2 as a broad band optical light source with a short coherence length, reflection devices (20, 21), which Just transmit a small portion of the optical energy, being provided at the end of the wave guide (4).

16. An optical amplifier according to claim 13, wherein the pump light of lowest order wavelength is $LP_{01}$.

17. An optical amplifier according to claim 3, wherein the wave guide (4) is made as a step index wave guide with an active doping of $Nd^{3+}$ in a region defined by the following relationships:

$a_1/a$ is in the range of 0.6 to 1.3

$a_2/a$ is in the range of 0.85 to 4.0.

* * * * *